(12) United States Patent
Yamaji et al.

(10) Patent No.: US 9,132,859 B2
(45) Date of Patent: Sep. 15, 2015

(54) VEHICLE SKELETON MEMBER

(71) Applicant: Teijin Limited, Osaka-shi, Osaka (JP)

(72) Inventors: Tadashi Yamaji, Matsuyama (JP); Koji Suzuki, Matsuyama (JP); Yutaka Yagi, Matsuyama (JP); Masatomo Teshima, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 13/957,487

(22) Filed: Aug. 2, 2013

(65) Prior Publication Data

US 2013/0313863 A1 Nov. 28, 2013

Related U.S. Application Data

(63) Continuation of application No. PCT/JP2012/052797, filed on Feb. 1, 2012.

(30) Foreign Application Priority Data

Feb. 3, 2011 (JP) .................................. 2011-021650

(51) Int. Cl.
*B62D 29/04* (2006.01)
*B62D 25/20* (2006.01)
(Continued)

(52) U.S. Cl.
CPC ............ *B62D 25/00* (2013.01); *B29C 65/0618* (2013.01); *B29C 66/112* (2013.01); *B29C 66/131* (2013.01); *B29C 66/1312* (2013.01); *B29C 66/524* (2013.01); *B29C 66/534* (2013.01); *B29C 66/543* (2013.01); *B29C 66/545* (2013.01); *B29C 66/721* (2013.01);
(Continued)

(58) Field of Classification Search
CPC .............. B62D 25/20; B62D 25/2009; B62D 25/2018; B62D 25/2027; B62D 25/2036; B62D 25/2045; B62D 29/04; B62D 29/041; B62D 29/043; B62D 29/045; B62D 29/046; B62D 29/048
USPC ................. 296/203.01–203.04, 209, 29, 204, 296/193.04, 181.2
See application file for complete search history.

(56) References Cited

U.S. PATENT DOCUMENTS 4,770,929 A * 9/1988 Nobumasa et al. ........... 442/278
6,206,458 B1 * 3/2001 Schroeder et al. ....... 296/203.01
(Continued)

FOREIGN PATENT DOCUMENTS

EP 0807566 A2 5/1997
EP 1772356 A1 4/2007
(Continued)

OTHER PUBLICATIONS

William D. Callister, Jr., Materials Science and Engineering an Introduction 3rd Edition, 1994, John Wiley and Sons, Inc., p. 529.*
(Continued)

*Primary Examiner* — Gregory Blankenship
(74) *Attorney, Agent, or Firm* — Banner & Witcoff, Ltd.

(57) ABSTRACT

Provided a vehicle skeleton member including: a portion obtained by joining a plurality of members constituted by a composite material of a thermoplastic resin and a reinforcing fiber, and an axis parallel to a front-rear direction and/or a right-left direction of the vehicle body is included in a joined surface by vibration welding.

6 Claims, 17 Drawing Sheets

(51) Int. Cl.
  *B62D 25/00* (2006.01)
  *B62D 25/02* (2006.01)
  *B62D 25/06* (2006.01)
  *B29C 65/00* (2006.01)
  *B29C 65/06* (2006.01)
  *B29L 31/30* (2006.01)
  *B29L 12/00* (2006.01)

(52) U.S. Cl.
  CPC ........ *B29C 66/73921* (2013.01); *B62D 25/025* (2013.01); *B62D 25/06* (2013.01); *B62D 25/20* (2013.01); *B62D 29/046* (2013.01); *B62D 29/048* (2013.01); *B29C 66/5414* (2013.01); *B29C 66/7212* (2013.01); *B29L 2012/00* (2013.01); *B29L 2031/3055* (2013.01)

(56) References Cited

U.S. PATENT DOCUMENTS

| | | | |
|---|---|---|---|
| 6,296,301 B1 * | 10/2001 | Schroeder et al. | 296/187.02 |
| 6,817,651 B2 * | 11/2004 | Carvalho et al. | 296/146.2 |
| 6,854,791 B1 * | 2/2005 | Jaggi | 296/203.01 |
| 7,128,360 B2 * | 10/2006 | Scheib et al. | 296/70 |
| 7,862,101 B2 * | 1/2011 | Lusk et al. | 296/178 |
| 8,066,321 B2 * | 11/2011 | Lusk et al. | 296/178 |
| 8,991,900 B2 * | 3/2015 | Yamaji et al. | 296/181.2 |
| 2002/0024236 A1 * | 2/2002 | Scheib et al. | 296/203.02 |
| 2004/0262954 A1 * | 12/2004 | Scheib et al. | 296/193.02 |
| 2008/0166511 A1 | 7/2008 | Honma et al. | |
| 2008/0185874 A1 * | 8/2008 | Kimoto et al. | 296/203.01 |
| 2010/0140980 A1 * | 6/2010 | Stanton | 296/203.01 |
| 2010/0148537 A1 * | 6/2010 | Stanton | 296/203.01 |
| 2010/0187865 A1 * | 7/2010 | Malek et al. | 296/203.03 |
| 2011/0143110 A1 | 6/2011 | Tsuchiya et al. | |
| 2012/0012263 A1 | 1/2012 | Tsuchiya et al. | |
| 2012/0104803 A1 * | 5/2012 | Thomas et al. | 296/203.01 |
| 2013/0309001 A1 * | 11/2013 | Teshima et al. | 403/270 |
| 2013/0313860 A1 * | 11/2013 | Yamaji et al. | 296/193.07 |
| 2013/0313862 A1 * | 11/2013 | Yamaji et al. | 296/203.01 |
| 2013/0313863 A1 * | 11/2013 | Yamaji et al. | 296/203.01 |

FOREIGN PATENT DOCUMENTS

| | | |
|---|---|---|
| JP | 61-166776 | 7/1986 |
| JP | 64-032982 | 2/1989 |
| JP | H03-010973 UM | 2/1991 |
| JP | 04-135720 | 11/1992 |
| JP | 06-278660 | 10/1994 |
| JP | 08-142197 | 6/1996 |
| JP | 2003-118651 A | 4/2003 |
| JP | 2005-225393 A | 8/2005 |
| JP | 2005-297417 A | 10/2005 |
| JP | 2005-317942 A | 11/2005 |
| JP | 2006-044260 A | 2/2006 |
| JP | 2006-044261 A | 2/2006 |
| JP | 2006-064010 A | 3/2006 |
| JP | 2007-262360 A | 10/2007 |
| JP | 2007-313778 A | 12/2007 |
| JP | 2008-068720 A | 3/2008 |
| JP | 2008143936 A | 6/2008 |
| JP | 2008-195223 A | 8/2008 |
| JP | 2010-235779 A | 10/2010 |
| WO | 2005-082982 | 9/2005 |

OTHER PUBLICATIONS

International Search Report issued in corresponding Japanese Patent Application No. PCT/JP2012/052797 mail Apr. 24, 2012.
International Preliminary Report on Patentability received in corresponding Japanese Patent Application No. PCT/ JP2012/052797 issued on Aug. 8, 2013.
Office Action dated Apr. 8, 2014 in corresponding European patent application 12 742 424.0-1757.
Supplementary European Search Report mailed Mar. 6, 2014 in corresponding European Application No. 12 74 2424.
Aug. 5, 2014—(JP) Office Action—App 2012556006—Concise Statement.
Jan. 27, 2015—(JP) Office Action—App 2012-556006.

* cited by examiner

⟺ : Vibration Direction

⇔ : Vibration Direction

Sect A-A

Sect B-B

⇔ : Vibration Direction

⇔ : Vibration Direction

Sect A-A

Sect B-B

⇔ : Vibration Direction

Sect A-A

Sect B-B

⇔ : Vibration Direction

Sect A-A

⟷ : Vibration Direction

Sect A-A

Sect B-B

VEHICLE SKELETON MEMBER

CROSS REFERENCE TO RELATED APPLICATION

This is a continuation of International Application No. PCT/JP2012/052797 filed on Feb. 1, 2012, and claims priority from Japanese Patent Application No. 2011-021650, filed on Feb. 3, 2011, the entire disclosures of which are incorporated herein by reference.

TECHNICAL FIELD

The present invention relates to a vehicle skeleton member having a member constituted by a composite material of a thermoplastic resin and a reinforcing fiber. Particularly, it relates to a vehicle skeleton member that is light in weight and excellent in strength.

BACKGROUND ART

A current vehicle skeleton member generally has a structure in which steel is subjected to sheet metal processing and assembled by spot welding.

Although the vehicle skeleton member has a very complex shape for providing a reinforcing structure for increasing body rigidity and a living space, a large limitation is not needed on the shape of a joint part owing to a robotized spot-welding technology, and therefore a high productivity is enabled.

On the other hand, in recent years, for decreasing environmental burdens of automobiles, saving of body weight has been strongly desired and application of a carbon fiber composite material to vehicle skeleton members has been attempted. In these vehicle skeleton members made from the carbon fiber composite material, their weight has been drastically saved as compared with the case of existing steel-made vehicle skeleton members. However, since the shapes of the members have to follow complex shape of the existing steel-made vehicle skeleton members, an expensive carbon fiber woven fabric is to be used and shaping thereof is performed by a hand lay-up or autoclave method that is low in productivity. Therefore, from the viewpoint of economic efficiency, wide range of use thereof has been extremely limited. Recently, although an improvement in productivity is attempted using RTM method (Resin Transfer Molding method) or the like (see, Patent Document 1), but it is hard to say that the technology can be applied to general vehicles, since a curing reaction time of a thermosetting resin used as a matrix is rate-limiting.

Moreover, at the application of the fiber-reinforced composite material to the vehicle skeleton member, the joint of the fiber-reinforced composite materials themselves and the joint of the fiber-reinforced composite material to the other material such as a metal become a problem. Although the fiber-reinforced composite material is light in weight and has a high strength, it is not preferable to apply a local load such as volt fastening, so that there have been proposed a large number of structures for dispersing the load at a fastening portion. Patent Document 2 shows examples of structures for attaching the fiber-reinforced composite material. The stress concentration at the joint portion can be avoided by these structures, but an improvement in productivity is limited since the structures are complex.

On the other hand, as a means for improving the productivity of fiber-reinforced composite materials, a thermoplastic fiber-reinforced composite material containing a thermoplastic resin used as a matrix has been developed. Such a thermoplastic fiber-reinforced composite material enables shaping within a short tact time by stamping after heated and plasticized. Since pressing pressure required for stamping is lower than that required for stamping molding of steel, integral molding is applicable in the case of such a size as a floor for a vehicle. Moreover, since the thermoplastic fiber-reinforced composite material can be softened by re-heating, it is also one characteristic that jointing by welding is possible.

(Patent Document 1) JP-A-2008-68720
(Patent Document 2) JP-A-2006-64010

DISCLOSURE OF THE INVENTION

Problems that the Invention is to Solve

An object of the present invention is to provide a vehicle skeleton member having a member including a composite material of a thermoplastic resin and a reinforcing fiber, in which a high joint strength is achieved at a joining portion of the composite materials and which has a sufficient strength as a vehicle structure.

Means for Solving the Problems

The present inventors have found that the above problem can be solved by constituting a vehicle skeleton member by a fiber-reinforced composite material made of a thermoplastic resin and a reinforcing fiber and joining the composite materials by vibration welding and further by designing a joining surface and a vehicle skeleton structure suitable for the vibration welding. Namely, the invention is a vehicle skeleton member having a portion obtained by joining together a plurality of members containing a composite material of a thermoplastic resin and a reinforcing fiber, and an axis parallel to a front and rear direction of a vehicle body and/or a right and left direction of the vehicle body is included on a surface of the joined portion by vibration welding.

Advantage of the Invention

The vehicle skeleton member of the invention has a portion obtained by joining a plurality of members containing a composite material of a thermoplastic resin and a reinforcing fiber, and an axis parallel to a front and rear direction of a vehicle body and/or a right and left direction of the vehicle body is included in a joining surface. And further, by arranging the joining portion on a flat surface including the axis and/or a curved surface including a uniform cross-sectional shape and the axis, it becomes possible to join a plurality of members simultaneously by vibration welding without providing a vibration welding device and a jig at each of every joining portions. Moreover, since it is possible to obtain a high joint strength for a short period of time through the joining by vibration welding as compared with the joining with a usual adhesive or a metal fastening member is not necessary, a vehicle structure excellent in weight-saving can be obtained in high productivity.

DESCRIPTION OF REFERENCE NUMERALS AND SIGNS

Figure 1:
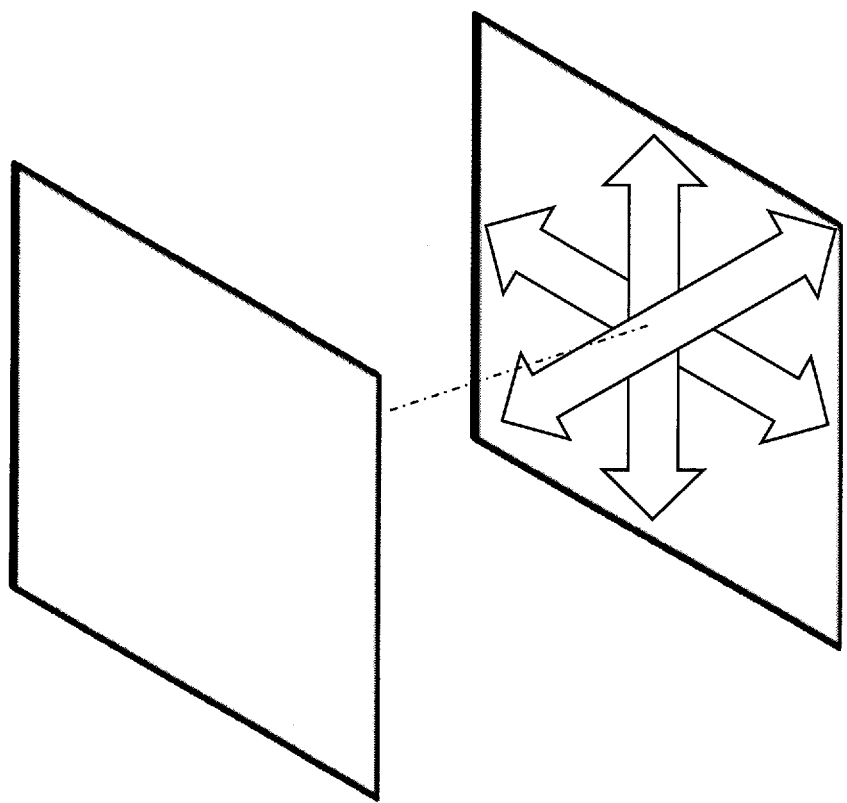
FIG. 1 is a schematic view showing a planar joining surface and vibration directions.

1 Vehicle skeleton member
2 Underfloor structural component
(2a, 2b, 2c, 2d: components)
3 Upperfloor structural component
(3a, 3b, 3c, 3d, 3e, 3f, 3g: components)
4 Side sill structural component
(4a, 4b, 4c: components)
5 Side sill structural component
(5a, 5b, 5c: components)
6 Vehicle body upper structural component (pillar-roof)
(6a, 6b, 6c, 6d, 6e, 6f: components)

MODE FOR CARRYING OUT THE INVENTION

The following will explain embodiments of the present invention in sequence.
[Vehicle Skeleton Member]
The vehicle skeleton member of the invention is a member constituting a vehicle body of an automobile. Specific examples include floor structural components, side sill structural components, vehicle body upper structural components including a pillar, a roof rail, and the like, and complexes thereof. The vehicle skeleton member has members including a composite material of a thermoplastic resin and a reinforcing fiber and has a portion at which these plural members including the composite material are joined. The vehicle skeleton member may have a member including a material other than the composite material, such as a metal, a ceramic, a composite material in which a matrix is a thermosetting resin or the like, in addition to the members including the composite material of the thermoplastic resin and the reinforcing fiber. From the viewpoint of weight-saving, it is preferable that the ratio of the member including the composite material in the vehicle skeleton member is high. Specifically, the weight ratio of the member including the composite material in the vehicle skeleton member is preferably 50% or more and more preferably 80% or more and 100% or less.
[Vibration Welding and Joining Surface]
The vibration welding is a method of joining two members (resin components etc.) through melting a resin by frictional heat generated between the two members by periodically vibrating the two members in a contact condition forced by pressurization and can be performed using a known vibration welding machine. In the vehicle skeleton member of the invention, the thermoplastic resin that is a matrix of the composite material is melted by vibration to effect joining.

The vehicle skeleton member of the invention is characterized in that the vehicle skeleton member is designed so that an axis parallel to a front and rear direction of a vehicle body and/or a right and left direction of the vehicle body is included in a joining surface at which vibration welding is performed. Namely, the vehicle skeleton member of the invention is characterized in that the joining portion is arranged so that the axis parallel to the front and rear direction of the vehicle body and/or the right and left direction of the vehicle body is contained in the joining surface and the vehicle skeleton member has a portion joined by vibration welding. Here, "parallel" is not necessarily "completely parallel" and a shift within substantially about ±10° is allowable. In this case, it is preferable that a plurality of joining surfaces are also shifted at a constant angle.

In the vehicle skeleton member, a joining surface partly containing no axis parallel to the front and rear direction of the vehicle body and/or the right and left direction of the vehicle body may be present. However, the ratio of the joining surface containing an axis parallel to the front-rear direction of the vehicle body and/or the right-left direction of the vehicle body is preferably from 50 to 100% of the total area of joining portion. Furthermore, the ratio of the joining surface containing the axis parallel to the front-rear direction of the vehicle body and/or the right-left direction of the vehicle body is more preferably 80 to 100% of the total joining area.

In the present invention, the joining area refers to an area for the joining in design, which is individually set depending on the kind of the joining method at the time of performing strength design of the joining portion between a plurality of components themselves or members themselves or between a component and a member, and is different from the total area of the joining portion. For example, in FIG. 7, FIG. 10, FIG. 12, FIG. 15, and FIG. 17, the place shown by an arrow in the cross-sectional view is a vibration welding portion and the total area of these places is the total joining area. In the vehicle skeleton member, the sum of the joining areas of all the joined portions is taken as total joining area.

In the case where the vehicle skeleton member is manufactured in a commercial level, in the vehicle skeleton member, it is preferable that the ratio of the joining surface containing the axis parallel to the front-rear direction of the vehicle body and/or the right-left direction of the vehicle body is high.

Specifically, it is preferable that 50% or more of all the joining surfaces contain the axis parallel to the front and rear direction of the vehicle body and/or the right and left direction of the vehicle body. More preferably, 80% or more of all the joining portions contain the axis parallel to the front-rear direction of the vehicle body and/or the right-left direction of the vehicle body.

In the case that a part of the joining surfaces contain no axis parallel to the front-rear direction and/or the right-left direction of the vehicle body, joining by vibration welding is possible by controlling the direction of the vibration welding device and using a jig each time, and it is also possible to appropriately joining or fastening them by a method other than vibration welding.

Since a production line of the vehicle body is preferably arranged on the axis parallel to the front and rear direction of the vehicle body and/or the right and left direction of the vehicle body, it is preferable to design the joining surface of the composite materials at the vehicle skeleton member so as to contain the axis parallel to the front and rear direction of the vehicle body and/or the right and left direction of the vehicle body.

In the case where the vehicle skeleton member is manufactured in a commercial level, a plurality of joining surfaces at the vehicle skeleton member are preferably present in the same direction in view of production efficiency. Specifically, the ratio of the joining surface present in the same direction to the total joining area is preferably from 50 to 100 and more preferably from 80 to 100%. Here, the definition of the joining area is as descried in the above.

Specifically, with regard to the number of the joining surfaces, it is preferably that 50% or more of all the joining portions are in the same direction and further 80% or more of all the joining portions are in the same direction.

Figure 2:
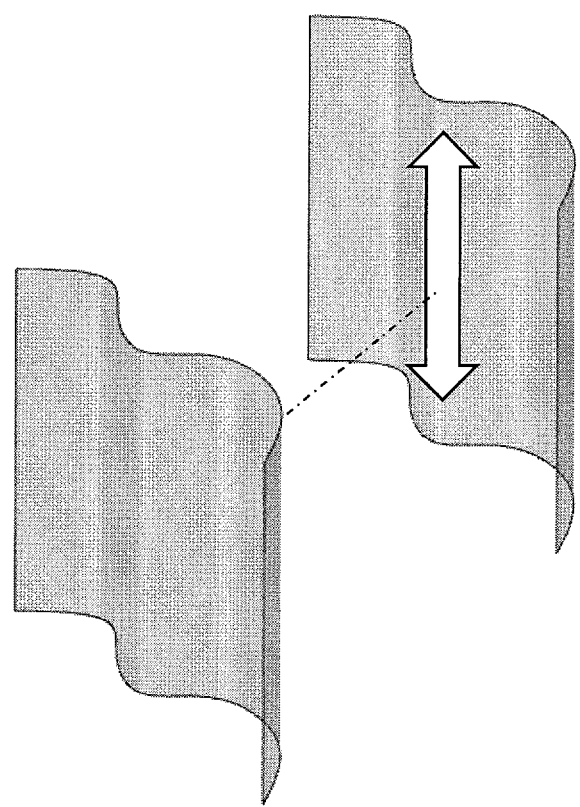
FIG. 2 is a schematic view showing a joining surface having a uniform cross-sectional shape and a vibration direction.

For joining by vibration welding, the welding surface of the composite material themselves in the vehicle skeleton member is preferably a plane surface and/or a curved surface having a uniform cross-sectional shape. The curved surface having a uniform cross-sectional shape means one having a shape in which a plane surface having a curved line is extruded in parallel. The cross-sectional shape may include a circle, an ellipse, a semicircle, a semicylinder, and the like. FIG. 1 shows a relationship between a plane joining surface and a vibration direction, but the vibration direction can be arbitrarily selected in the surface. FIG. 2 shows a relationship between joining surfaces, each of which has a uniform cross-sectional shape. In this case, the vibration direction is limited to the extrusion direction of the section. In the case where the joining surface is other than a plane surface and/or a curved surface having a uniform cross-sectional shape, joining or fastening can be appropriately performed by a method other than vibration welding.

The composite materials of the vehicle skeleton member of the invention is preferably joining by vibration welding in a ratio of 50% to 100% of the total joining area of the composite material. Here, the definition of the joining area is as described in the above. In the vehicle skeleton member, a fastening portion not resulting from vibration welding may be contained but, form the viewpoint of weight-saving, it is preferable to increase the ratio of joining by vibration welding. More preferably, in 70 to 100% of the total joining area, which is achieved by vibration welding. Moreover, with regard to number of the joining portions, it is preferable that 50% or more of all the portions are joined by vibration welding and further more preferably 80% or more thereof are joined by vibration welding.

As joining methods other than vibration welding in the composite material, there are known methods such as a method of using an adhesive agent, a method of mechanically fastening with a volt, a nut or the like, a method of adhesion by heating and melting the thermoplastic resin as a matrix resin by a method other than vibration, and these may be used in addition to the vibration welding in the invention.

In performance of vibration welding, clearance is necessary for frictional melting by vibrating the joining surfaces. For example, in a known vibration welding device, since a clearance of about 2 mm is necessary in a vibration direction, such a member shape that the clearance can be provided on a roof rail is selected or, in addition, it is also possible to use a method other than vibration welding in combination in the portion in which the clearance is difficult to be kept.

[Composite Material]

As the reinforcing fiber constituting the composite material, various fibers can be used according to the use application of a joined structure but preferred ones include one or more selected from the group consisting of glass fibers, polyester fibers, polyolefin fibers, carbon fibers, para-aramide fibers, meta-aramide fibers, boron fibers, azole fibers, alumina fibers, and the like. Particularly preferred is a carbon fiber excellent in specific strength and specific elasticity.

The form of the reinforcing fiber in the composite material may be a discontinuous fiber a continuous fiber, or two or more types thereof may be used in combination. The discontinuous fiber is specifically a short fiber having a fiber length of 0.1 to less than 10 mm or a long fiber having a fiber length of 10 mm to 100 mm. The continuous fiber becomes, needless to say, discontinuous depending on the size and shape of the vehicle skeleton member, so that one having a fiber length of more than 100 mm is regarded as the continuous fiber. In the case of the discontinuous fiber, a form of a paper made using chopped strands or the like or a two-dimensional random mat is preferred. In the case of the continuous fiber, preferred is a sheet-shaped form of a woven or knitted fabric, a unidirectionally oriented sheet-shaped product of strands, a multi axial woven fabric, and the like, or nonwoven fabric-shaped form. In this regard, the multi axial woven fabric generally means a woven fabric in which one obtained by stacking a bundle of fiber-reinforced material aligned in one direction in a sheet form with changing the angle (multi axial woven fabric base material) is stitched with a stitching thread such as a Nylon thread, a polyester thread, or a glass fiber thread through the stacked body in a thickness direction between the front side and the reverse side of the stacked body along a surface direction, back and forth. The fiber-reinforced material included in the fiber-reinforced composite material shaped product may be one in which a reinforcing fibers are randomly spread or one in which a reinforcing fibers are specifically oriented. Preferred is one in which a reinforcing fibers are in-plane oriented or oriented in one axis direction, or a combination thereof, or a stacked body thereof.

Of these, as the fiber-reinforced composite material, preferred is a random fiber-reinforced composite material in which chopped fibers are randomly oriented in a thermoplastic resin. Furthermore, when it is a two-dimensional random fiber-reinforced composite material in which chopped fibers are two-dimensionally randomly oriented in a thermoplastic resin, the material is extremely excellent in moldability and can be shaped into a vehicle skeleton member having not only a planar shape but also a complex shape including a curve part. A combination of the random fiber-reinforced composite material with another kind of fiber-reinforced composite material or a layer body thereof can be also suitably used for the vehicle skeleton member of the invention. The fiber-reinforced composite material can be a layer composed of a fiber-reinforced composite material and a thermoplastic resin, or a layer body or a sandwiched structure having a fiber-reinforced composite material layer in which the type of the reinforcing fibers are different. In the case of the sandwiched structure, a core member may be a composite material and a skin member may be a resin, and inversely, the core member may be a simple resin material and the skin member may be a composite material.

The weight ratio of reinforcing fiber/thermoplastic resin in the fiber-reinforced composite material is preferably from 20/80 to 80/20. More preferably, the ratio is from 30/70 to 70/30.

The thermoplastic resin specifically includes polycarbonate resins, polyolefin resins, polyester resins, acrylic resins, polylactic acid, polyamide resins, ASA resins, ABS resins, polyether ketone resins, polyether imide resins, polyphenylene ether resins, polyphenylene oxide resins, polysulfone resins, polyether sulfone resins, polyether imide resins, polyether ether ketone resins, polyphenylene sulfide resins, polyamide imide resins, and two or more mixtures (resin compositions) selected from these resins but is not particularly limited.

EXAMPLES

Specific examples of embodiments of the invention will be explained with reference to FIG. 3 to FIG. 17 but the invention should not be construed as being limited thereto.

Figure 3:
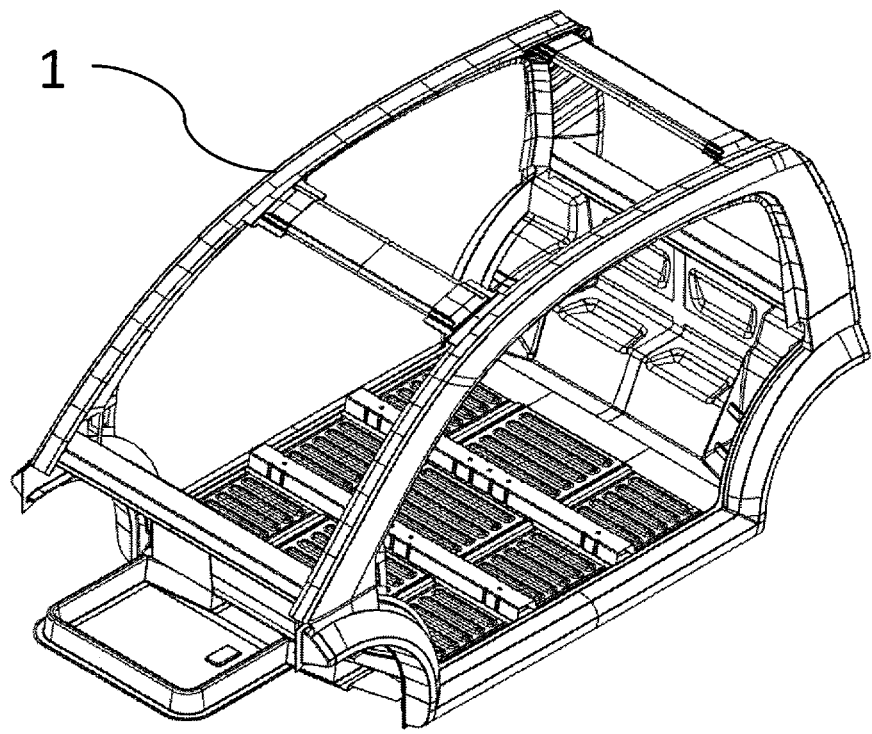
FIG. 3 is a schematic view showing an example of the vehicle skeleton member of the invention.
Figure 4:
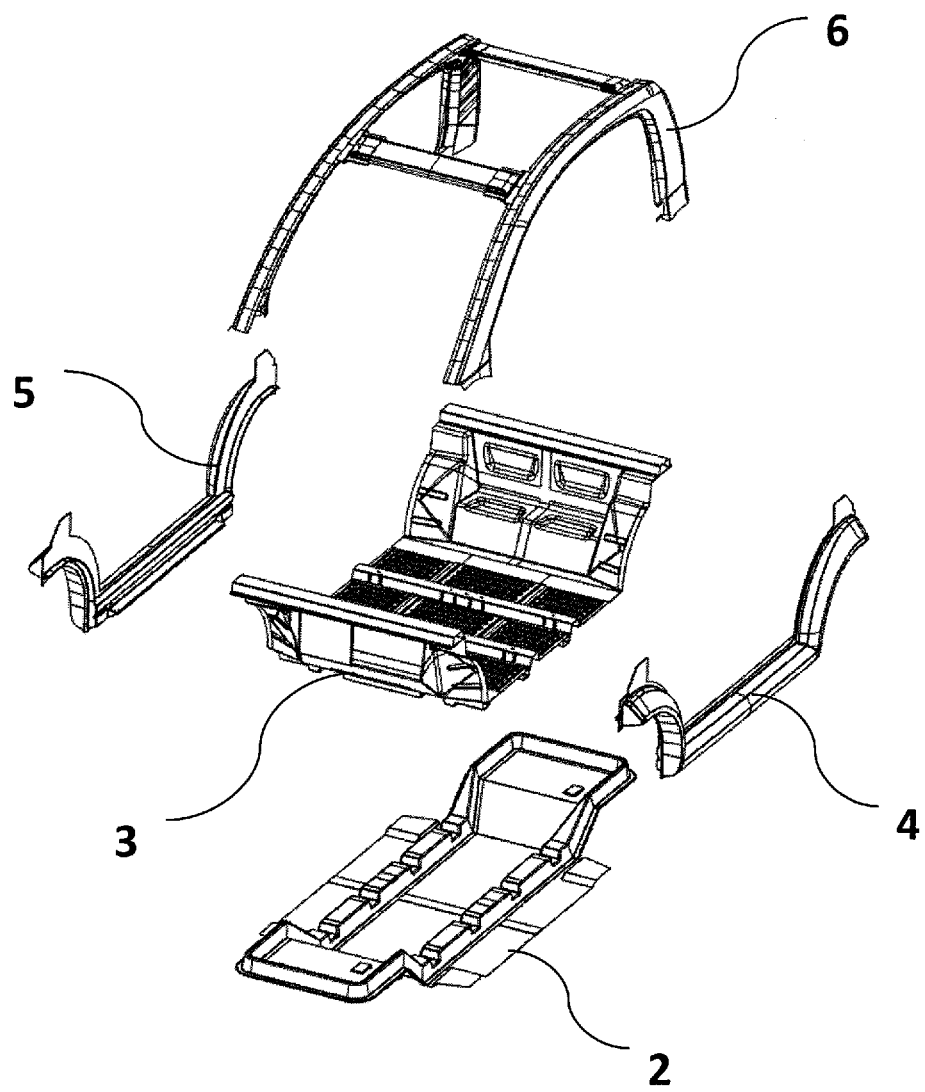
FIG. 4 is a schematic view showing a constitution of the vehicle skeleton member of the invention.

FIG. 3 is a schematic view showing a vehicle skeleton member that is an example of the invention. A vehicle skeleton member 1 in the present example having an underfloor structural component 2, an upperfloor structural component 3, right and left side sill structural components 4 and 5, and a vehicle body upper structural component 6 including pillar-roof rail. As in the present example, all of the underfloor structural component 2, the upperfloor structural component 3, the right and left side sill structural components 4 and 5, and the vehicle body upper structural component 6 may be combined to form the vehicle skeleton member or each structural component and/or a complex of two or more structural components may be formed into the vehicle skeleton member.

Figure 5:
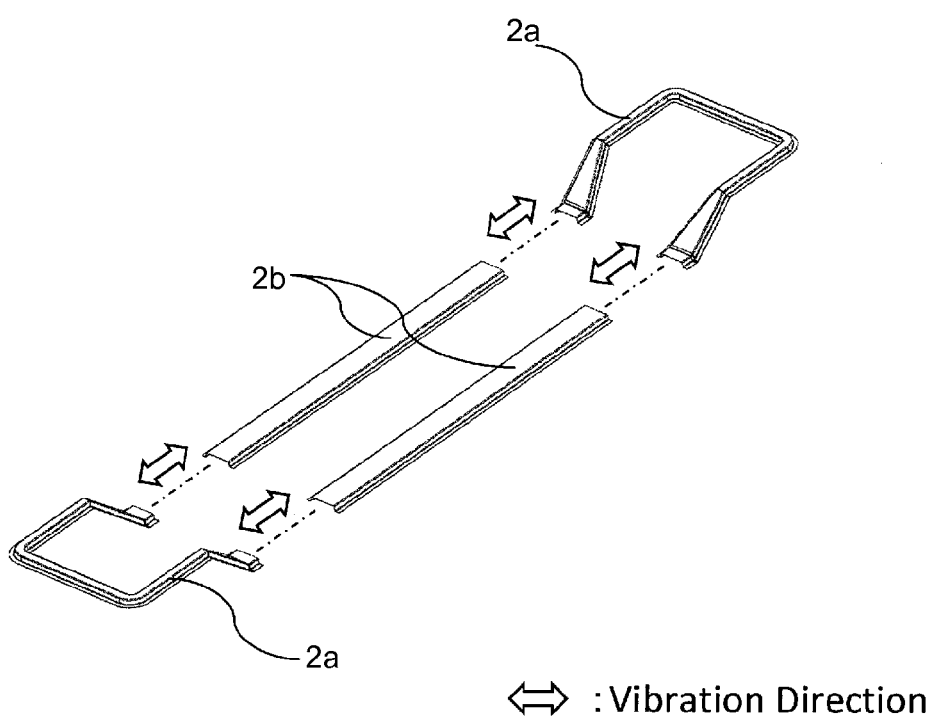
FIG. 5 is a schematic view showing an assembling method in the case where the vehicle skeleton member is an underfloor structural component.
Figure 6:
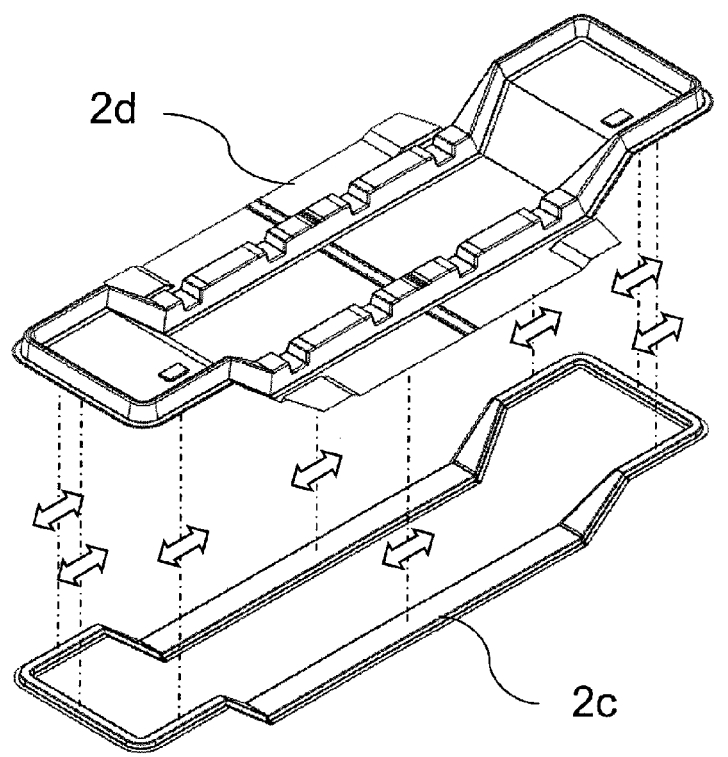
FIG. 6 is a schematic view showing an assembling method in the case where the vehicle skeleton member is an underfloor structural component.

FIG. 5 and FIG. 6 show assembling methods in the case where the vehicle skeleton member is the underfloor structural component 2. The underfloor structural component 2 can be manufactured by vibration-welding a component 2a and a component 2b to manufacture a component 2c, and vibration-welding the component 2c to the under surface of a component 2d. Here, the component 2c may be manufactured with dividing into the component 2a and the component 2b or may be integrally formed. In the case of vibration welding of the component 2c and the component 2d, since clearance is needed in a front and rear direction and also a rising part of the component 2c cannot be subjected to vibration welding, it is desirable to use a method other than vibration welding in combination.

Figure 7:
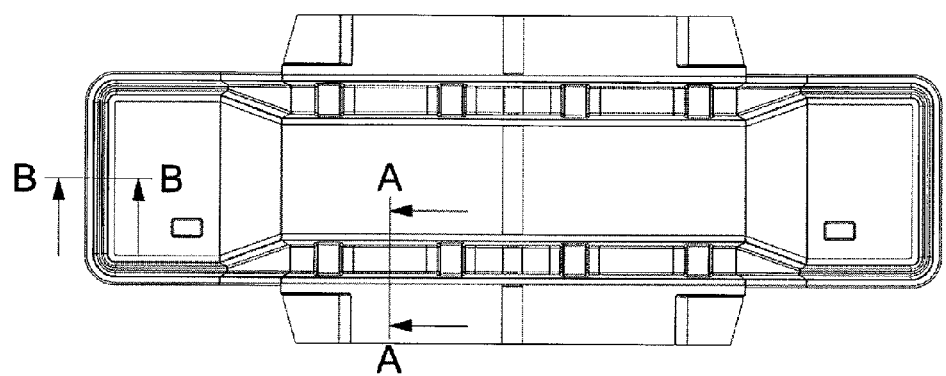
FIG. 7 is a schematic view showing cross-sectional shapes of vibration-welded parts of an underfloor structural component.
Figure 7:
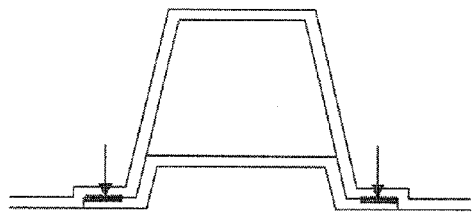
Figure 7:
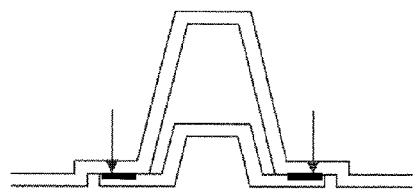

FIG. 7 shows cross-sectional shapes of vibration-welded portions of the underfloor structural component 2 and the arrowed places in the cross-sectional view are vibration-welded parts.

Figure 8:
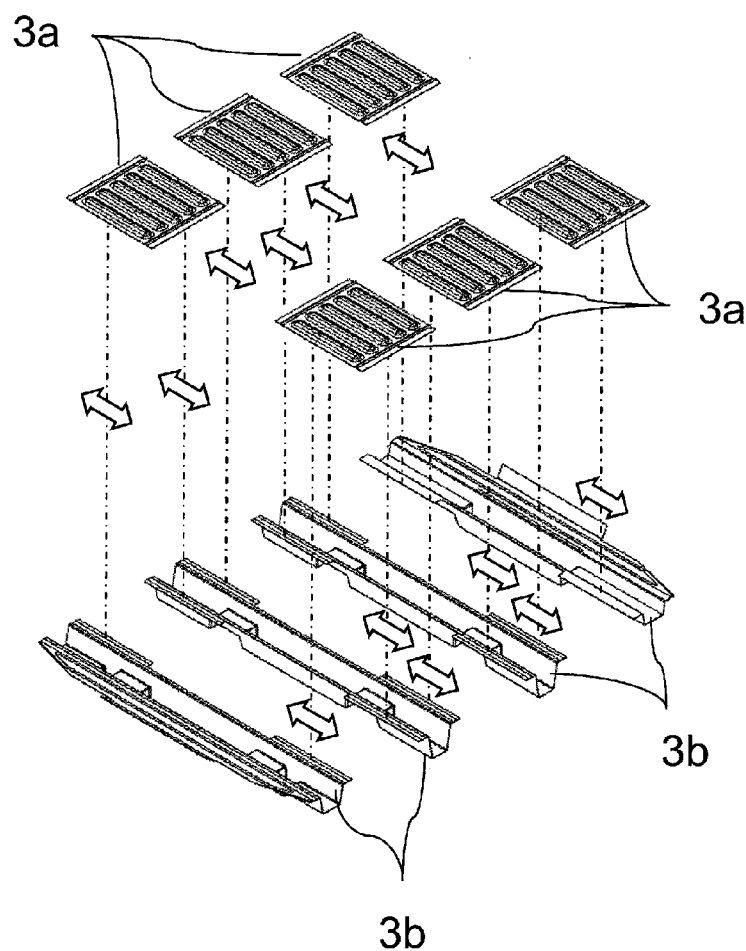
FIG. 8 is a schematic view showing an assembling method in the case where the vehicle skeleton member is an upperfloor structural component.
Figure 9:
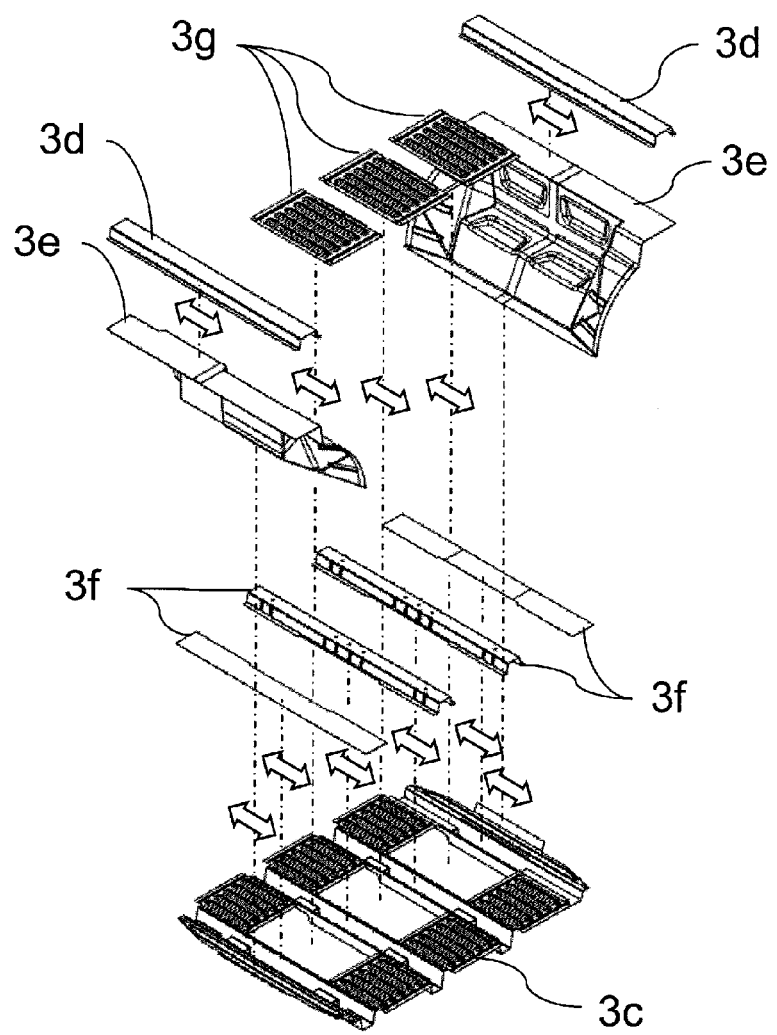
FIG. 9 is a schematic view showing an assembling method in the case where the vehicle skeleton member is an upperfloor structural component.
Figure 10:
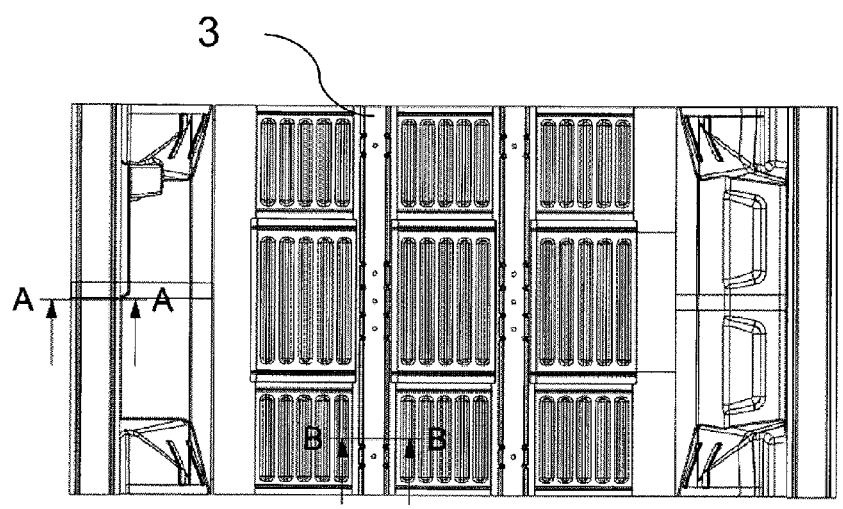
FIG. 10 is a schematic view showing cross-sectional shapes of vibration-welded parts of an upperfloor structural component.
Figure 10:
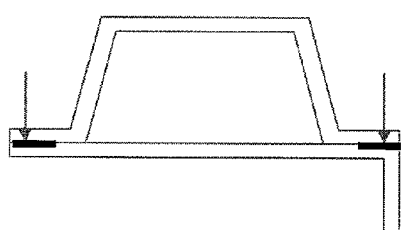
Figure 10:
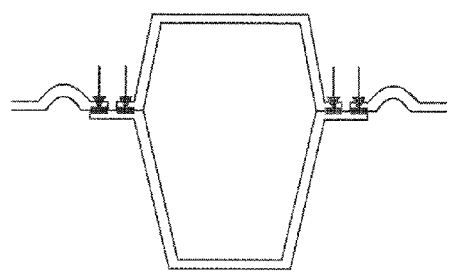

FIG. 8 and FIG. 9 show assembling methods in the case where the vehicle skeleton member is the upperfloor structural component 3. A component 3a and a component 3b are vibration-welded to manufacture a component 3c. After a component 3d and a component 3e are vibration-welded, the resulting one is vibration-welded to the component 3c and also a component 3f is vibration-welded to the component 3c. The component 3g may be made a detachable structure as a cover in the case where a battery is housed in a floor or may be jointed to the component 3c by vibration welding. Here, the component 3a, the component 3b, and the component 3e may be joined by vibration welding after separately manufactured or may be integrally formed in a mold. FIG. 10 shows cross-sectional shapes of the vibration-welded portions of the upperfloor structural component 3 and the arrowed places in the cross-sectional view show vibration-welded parts.

Figure 11:
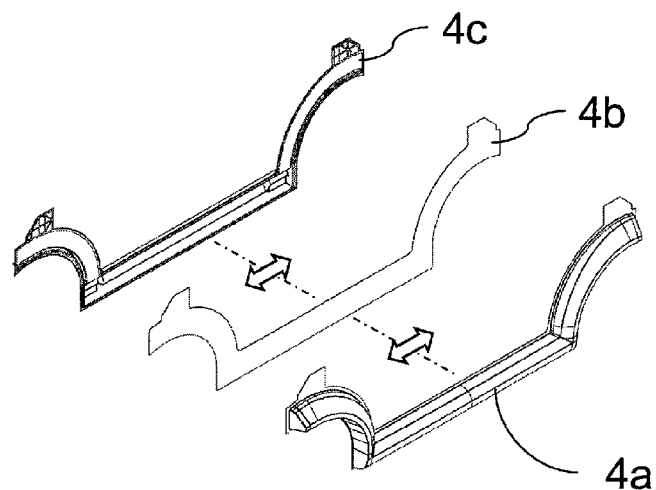
FIG. 11 is a schematic view showing an assembling method in the case where the vehicle skeleton member is a side sill structural component.
Figure 11:
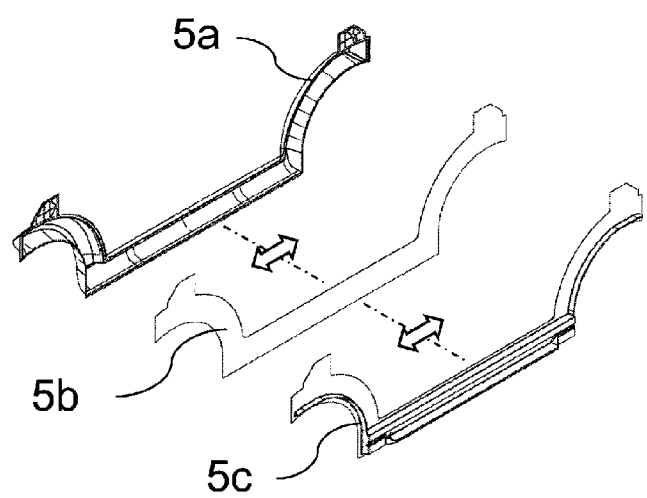
Figure 12:
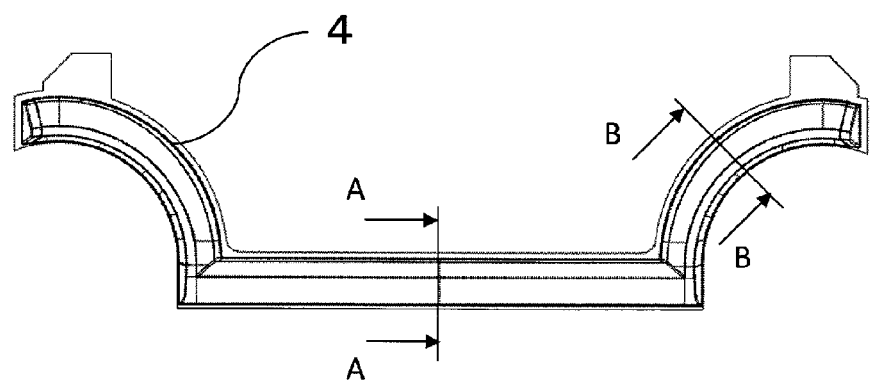
FIG. 12 is a schematic view showing cross-sectional shapes of vibration-welded parts of a side sill structural component.
Figure 12:
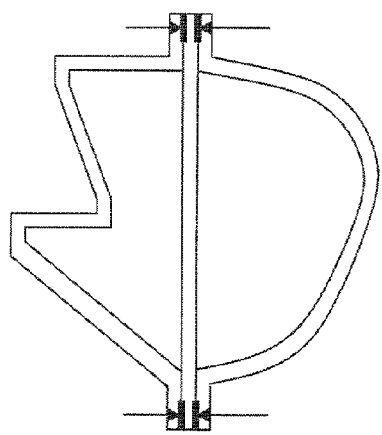
Figure 12:
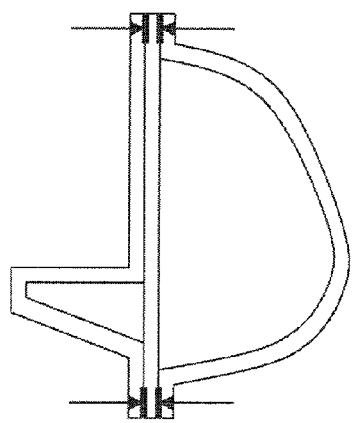

FIG. 11 shows an assembling method in the case where the vehicle skeleton member is the side sill structural components 4 and 5. A component 4a and a component 4b, and a component 5a and a component 5b are vibration-welded and thereafter a component 4c and a component 5c are vibration-welded each other, whereby the side sill structural components 4 and 5 can be manufactured. FIG. 12 shows cross-sectional shapes of vibration-welded portions of a side sill structural component 4 and the arrowed places in the cross-sectional view show vibration-welded parts.

Figure 13:
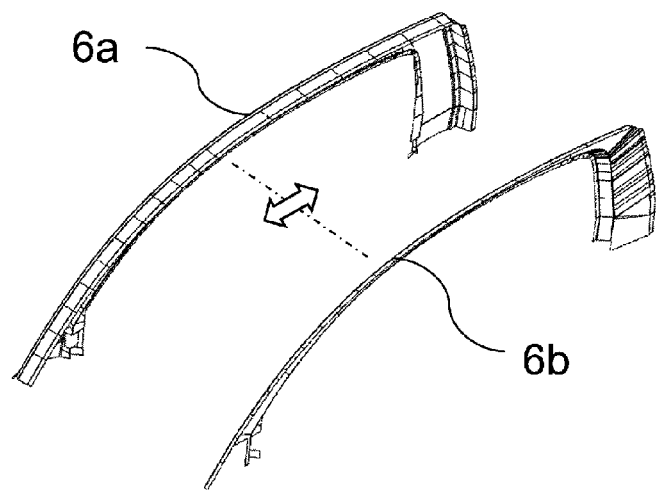
FIG. 13 is a schematic view showing an assembling method in the case where the vehicle skeleton member is a vehicle body upper structural component.
Figure 13:
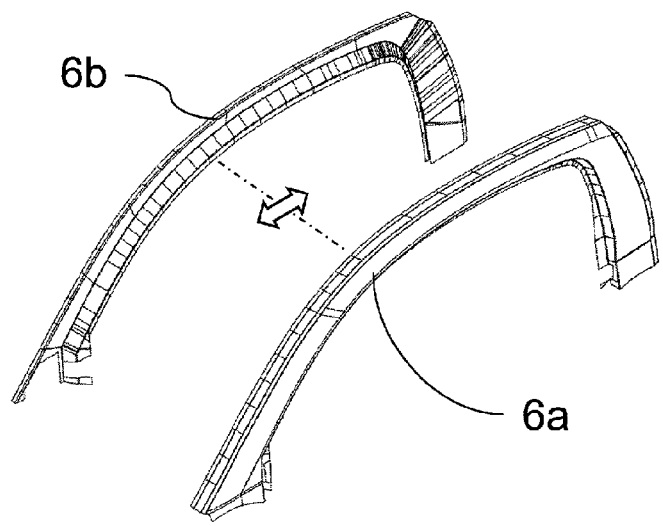
Figure 14:
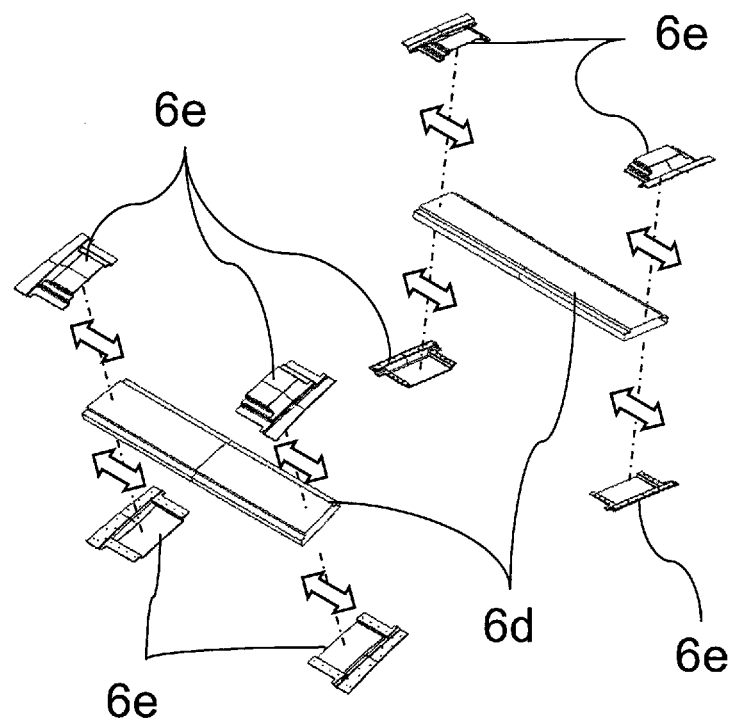
FIG. 14 is a schematic view showing an assembling method in the case where the vehicle skeleton member is a vehicle body upper structural component.
Figure 14:
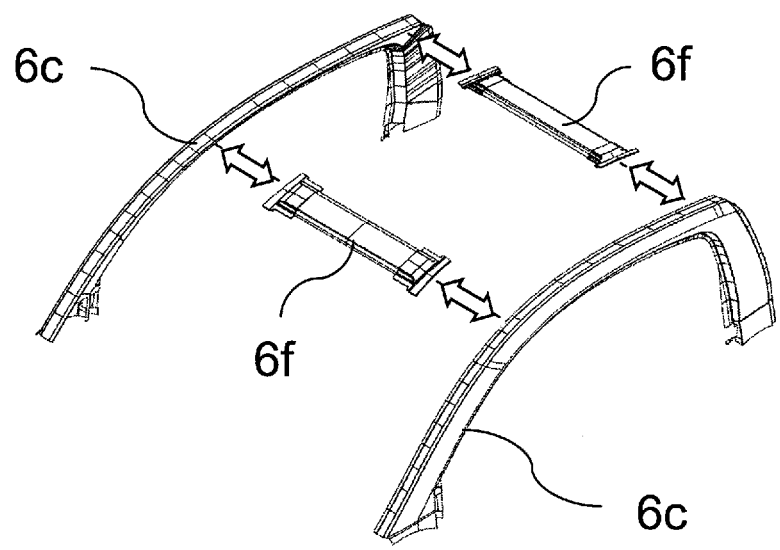
Figure 15:
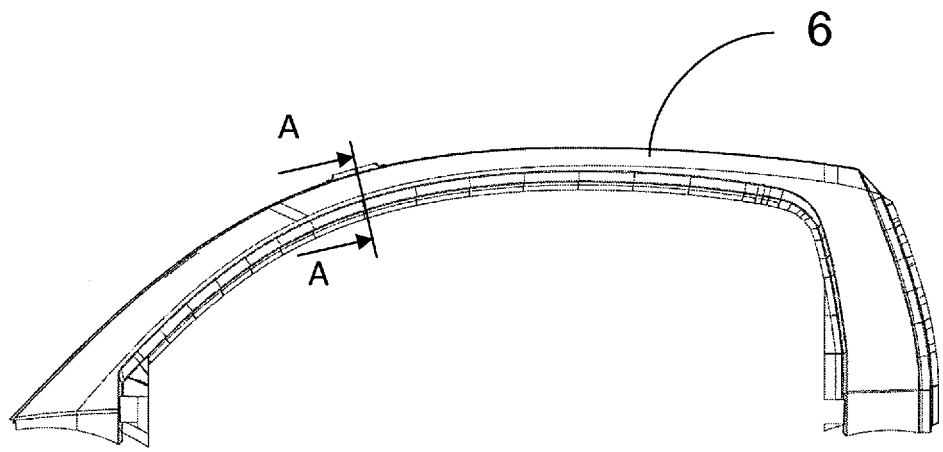
FIG. 15 is a schematic view showing a cross-sectional shape of a vibration-welded part of a vehicle body upper structural component.
Figure 15:
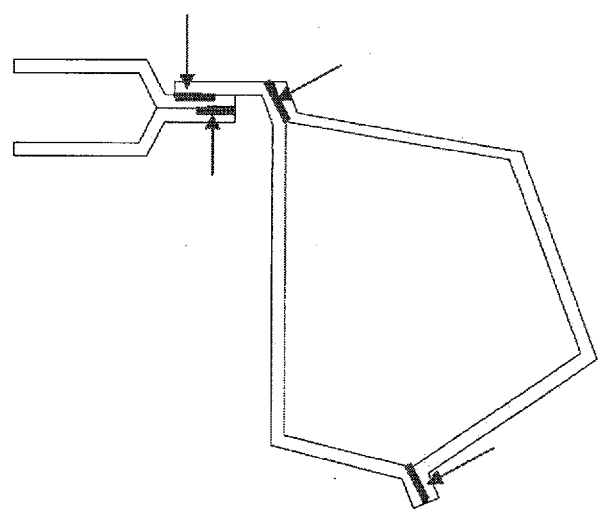

FIG. 13 and FIG. 14 show assembling methods in the case where the vehicle skeleton member is the body upper structural component 6. A component 6a and a component 6b are vibration-welded to manufacture one pair of right and left pillars 6c. Here, the component 6a and the component 6b may be separately manufactured or may be integrally formed as a hollow entire piece. Thereafter, a component 6d and a component 6e are vibration-welded so that the component 6d is sandwiched with the components 6e to manufacture a roof rail 6f, and the pillar 6c and the roof rail 6f are joined by vibration welding. Here, the component 6d and the component 6e may be separately manufactured or may be integrally formed. FIG. 15 shows a cross-sectional shape of a vibration-welded portion of the body upper structural component 6 and the arrowed places in the cross-sectional view show vibration-welded parts.

Figure 16:
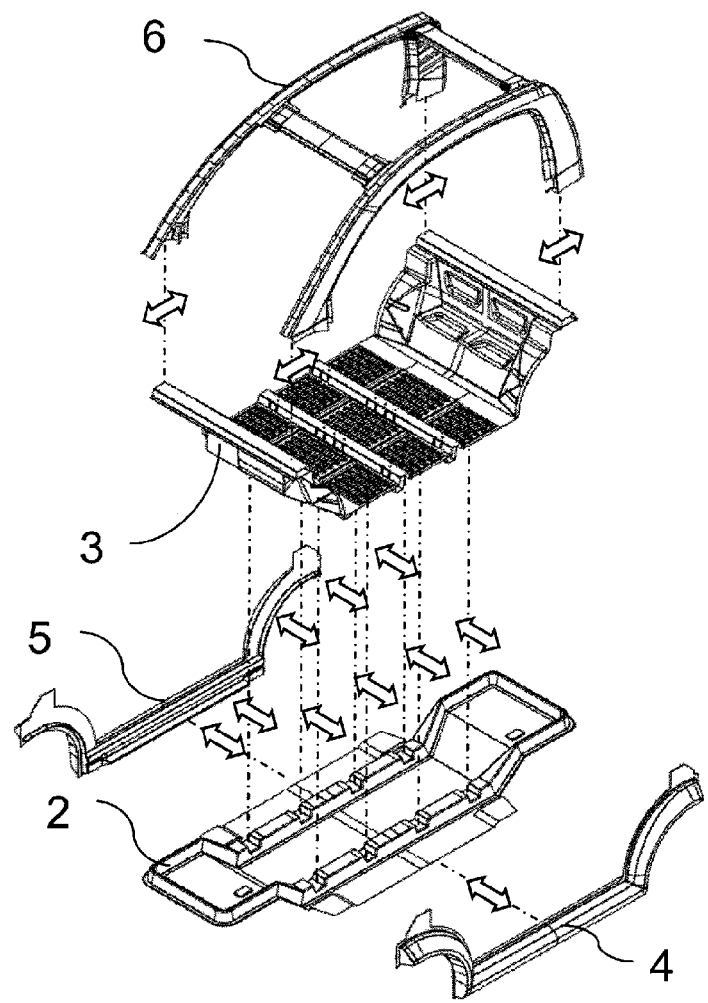
FIG. 16 is a schematic view showing an assembling method in the case where the vehicle skeleton member is constituted by integrating individual structural components.

FIG. 16 shows an assembling method in the case where the underfloor structural component 2, the upperfloor structural component 3, the right and left side sill structural components 4 and 5, and the body upper structural component 6 including pillar-roof rail are integrated to form the vehicle skeleton member.

Figure 17:
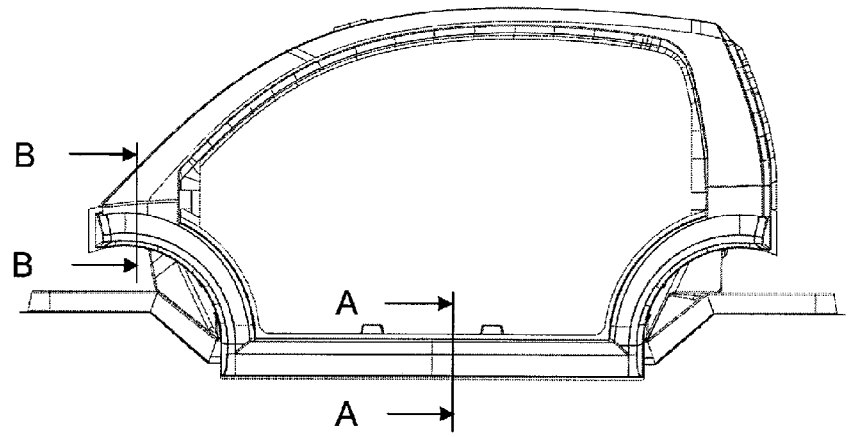
FIG. 17 is a schematic view showing cross-sectional shapes of vibration-welded parts of an integrated vehicle skeleton member.
Figure 17:
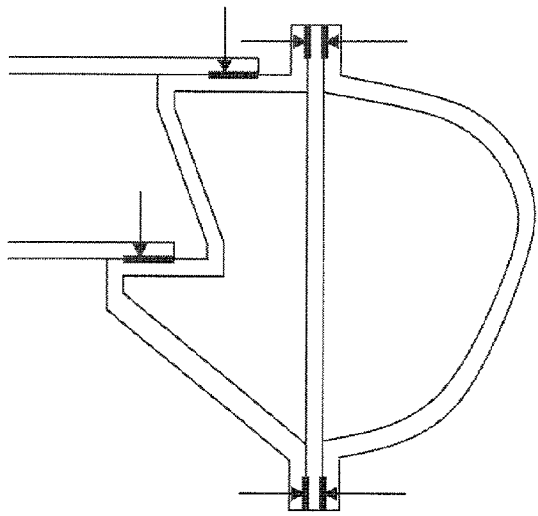
Figure 17:
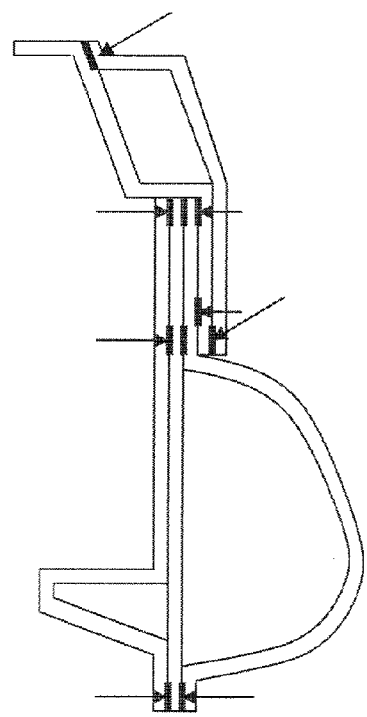

The underfloor structural component 2 and the side sill structural components 4 and 5 are vibration-welded and thereafter, the upperfloor structural component 3 is vibration-welded, and the body upper structural component 5 is vibration-welded to thereby manufacture the integrated vehicle skeleton member 1. FIG. 17 shows cross-sectional shapes of vibration-welded portions of the integrated vehicle skeleton member 1 and the arrowed places in the cross-sectional view show vibration-welded parts.

The invention claimed is:
1. A vehicle skeleton member comprising:
a joined portion obtained by joining a plurality of members constituted by a composite material of a thermoplastic resin and chopped reinforcing fibers,
wherein an axis parallel to a front and rear direction of a vehicle body, an axis parallel to a right and left direction of the vehicle body, or both, is included on a joining surface joined by vibration welding,
wherein the joining surface is a planar surface, a curved surface having a uniform cross-sectional shape, or a combination thereof,
wherein the composite material includes a two-dimensionally random fiber-reinforced composite material in which the chopped reinforcing fibers are two-dimensionally randomly oriented in the thermoplastic resin, and wherein the vehicle skeleton member is at least one selected from the group consisting of a floor structural component and a side sill structural component.

2. The vehicle skeleton member according to claim 1, wherein the chopped reinforcing fibers are chopped carbon fibers.

3. The vehicle skeleton member according to claim 1, wherein a ratio of the joining surface including the axis parallel to the front and rear direction of the vehicle body, the axis parallel to the right and left direction of the vehicle body, or both, is from 50 to 100% of a total area of the joined portion.

4. The vehicle skeleton member according to claim 1, wherein the joining surface is joined by vibration welding in a vibration direction which is the right and left direction of the vehicle body.

5. A method of manufacturing a vehicle skeleton member, comprising:

vibration-welding a plurality of members comprising a two-dimensionally random fiber-reinforced composite material including a thermoplastic resin and chopped reinforcing fibers being two-dimensionally randomly oriented in the thermoplastic resin in an axis direction parallel to a front and rear direction of a vehicle body or to a right and left direction of the vehicle body so as to join the plurality of members at a joining surface, wherein the joining surface is a planar surface, a curved surface having a uniform cross-sectional shape, or a combination thereof; a vibration-welding direction is the front and rear direction and the right and left direction; and the vehicle skeleton member is at least one selected from the group consisting of a floor structural component and a side sill structural component.

6. The method according to claim 5, wherein the vibration-welding a plurality of members comprising a two-dimensionally random fiber-reinforced composite material including a thermoplastic resin and chopped reinforcing fibers comprises vibration-welding a plurality of members comprising a two-dimensionally random fiber-reinforced composite material including a thermoplastic resin and chopped carbon fibers.

* * * * *